(12) United States Patent
Shen et al.

(10) Patent No.: US 9,640,223 B2
(45) Date of Patent: May 2, 2017

(54) METHODS, APPARATUS AND SYSTEMS FOR TIME-BASED AND GEOGRAPHIC NAVIGATION OF VIDEO CONTENT

(71) Applicant: TVU Networks Corporation, Mountain View, CA (US)

(72) Inventors: Paul Shen, Woodside, CA (US); Matthew Richard McEwen, San Jose, CA (US); Shiwen Yao, Sunnyvale, CA (US)

(73) Assignee: TVU Networks Corporation, Mountain View, CA (US)

( * ) Notice: Subject to any disclaimer, the term of this patent is extended or adjusted under 35 U.S.C. 154(b) by 0 days.

(21) Appl. No.: 14/666,467

(22) Filed: Mar. 24, 2015

(65) Prior Publication Data

US 2015/0310895 A1    Oct. 29, 2015

Related U.S. Application Data

(60) Provisional application No. 61/971,224, filed on Mar. 27, 2014.

(51) Int. Cl.
*H04N 9/80* (2006.01)
*G11B 27/34* (2006.01)
(Continued)

(52) U.S. Cl.
CPC .......... *G11B 27/34* (2013.01); *G06F 17/3082* (2013.01); *H04N 21/2353* (2013.01);
(Continued)

(58) Field of Classification Search
CPC ... H04N 2201/3214; H04N 2201/3115; H04N 5/23293; H04N 5/23222; H04N 5/77;
(Continued)

(56) References Cited

U.S. PATENT DOCUMENTS 6,504,571 B1 *  1/2003  Narayanaswami    G06F 17/30265
                                                      348/231.99
7,472,175 B2    12/2008  Bartholomew
                        (Continued)

FOREIGN PATENT DOCUMENTS

EP          0959418        11/1999

OTHER PUBLICATIONS

International Search Report for PCT/US2015/022419, 1 page, Jun. 25, 2015.

*Primary Examiner* — Huy T Nguyen
(74) *Attorney, Agent, or Firm* — Lipsitz & McAllister, LLC

(57) ABSTRACT

Methods, apparatus, and systems for time-based and geographic navigation of video content are provided. Video content and associated metadata information are recorded and encoded using a video capture and encoding module. The associated metadata information includes at least one of date and time information of the recording and geographic position information indicative of a recording location. The recorded video content and the associated metadata information are communicated to a remote storage and web server device. A graphical user interface enables the display of an interactive map showing a route and current location of the video capture and encoding module. The video content may be searched using at least one of the graphical user interface and the interactive map by the date and/or time information and the geographic position information. Selected video content can be streamed or downloaded to a select location for display or storage.

27 Claims, 2 Drawing Sheets

(51) Int. Cl.
 *H04N 21/235* (2011.01)
 *H04N 21/2743* (2011.01)
 *H04N 21/472* (2011.01)
 *H04N 21/84* (2011.01)
 *G06F 17/30* (2006.01)

(52) U.S. Cl.
 CPC ... *H04N 21/2743* (2013.01); *H04N 21/47205* (2013.01); *H04N 21/84* (2013.01)

(58) Field of Classification Search
 CPC ........... H04N 21/2743; H04N 21/2665; H04N 21/2655; H04N 21/47205; G11B 27/34
 See application file for complete search history.

(56) References Cited

U.S. PATENT DOCUMENTS

| | | | |
|---|---|---|---|
| 8,890,866 B2* | 11/2014 | Meadow | G06T 17/05 345/419 |
| 2007/0067104 A1* | 3/2007 | Mays | G01C 21/36 701/437 |
| 2008/0266324 A1 | 10/2008 | Lynch et al. | |
| 2010/0122174 A1 | 5/2010 | Snibbe et al. | |
| 2010/0333034 A1 | 12/2010 | Carlson et al. | |
| 2010/0333155 A1* | 12/2010 | Royall | H04N 7/17318 725/105 |
| 2011/0025851 A1* | 2/2011 | Rumble | G01J 5/02 348/148 |
| 2011/0029883 A1 | 2/2011 | Lussier et al. | |
| 2011/0030031 A1 | 2/2011 | Lussier et al. | |
| 2011/0306326 A1 | 12/2011 | Reed et al. | |
| 2011/0311199 A1 | 12/2011 | Fay et al. | |
| 2012/0060177 A1 | 3/2012 | Stinson, III et al. | |
| 2012/0062590 A1 | 3/2012 | Morohoshi et al. | |
| 2012/0102124 A1 | 4/2012 | Hansson et al. | |
| 2012/0282914 A1 | 11/2012 | Alexander | |
| 2013/0073623 A1 | 3/2013 | Nguyen et al. | |
| 2013/0268962 A1 | 10/2013 | Snider et al. | |
| 2013/0302005 A1 | 11/2013 | Harwell et al. | |
| 2013/0329086 A1 | 12/2013 | Malone | |
| 2014/0012895 A1 | 1/2014 | Lieberman et al. | |
| 2014/0067955 A1 | 3/2014 | Christian | |
| 2014/0213304 A1 | 7/2014 | Beckett et al. | |
| 2014/0258158 A1 | 9/2014 | Levy | |

* cited by examiner

METHODS, APPARATUS AND SYSTEMS FOR TIME-BASED AND GEOGRAPHIC NAVIGATION OF VIDEO CONTENT

This application claims the benefit of U.S. Provisional Application No. 61/971,224 filed on Mar. 27, 2014 which is incorporated herein and made a part hereof by reference for all purposes.

BACKGROUND OF THE INVENTION

The present invention relates generally to the field of video recording. More specifically, the present invention relates to methods, apparatus, and systems for time-based and geographic navigation of recorded or live video content.

Every day, television stations and professionals involved in video production shoot countless hours of video content using camcorders or other types of external recorders in the field. Some of this content may be streamed live to a television station (or other news venue, website, or the like) using various methods such as cellular based uplink devices, satellites, microwave transmission, or other means. However, the majority of the content will remain on the original camcorder media or recording device until it is physically brought back to the studio (or other production facility) or transferred asynchronously via IP to the studio, which can be a very time consuming process.

Once the original content arrives back in the studio, it rarely provides the end-user (editor or production staff) with details of the recording other than the time of recording (e.g., via a time-stamp) and the user typically must preview the content in order to locate the desired content.

It would be advantageous to enable the ability to search for content based on geographic location and/or time. It would be further advantageous to leverage the use of GPS systems in connection with the storage of metadata information which includes time and geographic information for the video content.

The methods, apparatus and systems of the present invention provide the foregoing and other advantages.

SUMMARY OF THE INVENTION

The present invention relates to methods, apparatus, and systems for time-based and geographic navigation of recorded or live video content.

An example embodiment of a system for time-based and geographic navigation of video content in accordance with the present invention comprises an Internet enabled video capture and encoding module for recording and encoding video content and associated metadata information for storage and transmission. The associated metadata information includes at least one of date and time information of the recording and geographic position information indicative of a recording location of the video capture and encoding module during the recording. The system also comprises a remote storage and web server device for receiving the recorded video content and the associated metadata information from the video capture and encoding module. The system further comprises a graphical user interface associated with the remote storage and web server device. The graphical user interface comprises an interactive map showing a route and a current location of the video capture and encoding module and enabling a search of the recorded video content by the at least one of the date and time information and the geographic position information. Selected recorded video content can be one of streamed or downloaded to a select location for display or storage.

The system may also comprise a local storage module associated with the video capture and encoding module for locally storing the recorded video content and associated metadata information. The local storage module may be integrated into the video capture and encoding module or connected to the video capture and encoding module via a wired or wireless connection. The local storage module may store a high-resolution version of the video content and/or a low resolution version of the video content. A low-resolution version of the video content may be provided to the remote storage and web server device.

Alternatively, at least one of a high-resolution version or a low-resolution version of the video content may be provided (either directly from the video capture and encoding module or via the local storage module) to the remote storage and web server device.

Upon selection of the recorded video content, a high-resolution version of the selected recorded video content is streamed or downloaded to the select location. The high-resolution version of the selected recorded video content may be streamed or downloaded from one of a local storage module associated with the video capture and encoding module or the remote storage and web server device.

The select location may comprise one of a video server, a client viewing device, a broadcast television channel, a streaming channel, a newsfeed, a website, a social media platform, a playout server, an archive server, a news automation system, a non-linear editing system, a content delivery network (CDN), an online video portal (OVP), and the like.

The system may comprise multiple video capture and encoding modules. In such an example embodiment, a corresponding plurality of routes and current locations for each of the plurality of the video capture and encoding modules are displayed on the interactive map.

For each of the recording locations along the route, a waypoint indicator may be displayed on the route on the interactive map. Selecting one of the waypoint indicators may enable viewing of one of a low-resolution photograph or a low resolution video clip from the recorded content at the corresponding recording location.

The waypoint indicators may comprise one of a low-resolution photograph or a low resolution video clip from the recorded content at the corresponding recording location.

A number of waypoint indicators displayed along each route may be configurable. In addition, a number of waypoint indicators displayed along each route may be automatically adjusted when zooming or expanding a map view of the map.

The graphical user interface may further comprise a table showing date, time and GPS coordinates for each way point. Selecting an entry from the table may enable viewing of one of a low-resolution photograph or a low resolution video clip from the recorded content at the corresponding recording location.

The system may further comprise a GPS module associated with the video capture and encoding module for providing the geographic position information.

The metadata information may further comprise at least one of camera location, length of video, video and audio format, timecode, size of video file, camera identification information, ownership and copyright information, and additional metadata information predefined or dynamically logged by a user, or any other type of identifying information. The additional metadata information may include at least one of assignment name, geographic location, camera man name, reporter name, camera crew name, assistant name, producer name, story title, subject matter reference, program name, user comments, and the like. The video content may be searchable by any of the metadata information or a combination of any of the metadata information.

The video content may be further searchable using at least one of a range of dates, a range of times, a timecode, and a current time.

The interactive map may display current position, speed, and direction information of the video capture and encoding module.

The video capture and encoding module may comprise one of a video camera, a camcorder, a television camera, a movie camera, a portable electronic device, a tablet computer, a smart phone, an IP or web camera, or the like.

The system may further comprise a remote access device for remotely accessing the remote storage and web server device. In such an example embodiment, the graphical user interface may be displayed on the remote access device. The remote access device may comprise one of a computer, a laptop computer, a portable electronic device, a tablet computer, a smart phone, and the like.

The remote storage and web server device may comprise one of a computer running a local software application or a cloud-based application.

The selected recorded video content may comprise one of a selected portion of the recorded content at high-resolution or low resolution, the entirety of the recorded content at high-resolution or low resolution, and a selected image or images from the recorded content at high-resolution or low-resolution.

The metadata may be one of: recorded and stored simultaneously with the recorded video content at the remote storage and web server device in real-time or near real-time; or subsequently transferred with the recorded video content to the remote storage and web server device from local storage associated with the video capture and encoding module.

Alternatively, the metadata may be one of: recorded and stored without the recorded video content at the remote storage and web server device in real-time or near real-time; or subsequently transferred to the remote storage and web server device from local storage associated with the video capture and encoding module separately from the recorded video content.

The graphical user interface may further comprise at least one of: a zoom feature for zooming in on the route or a portion of the route; an expand feature for expanding an area of the map; a location change feature for changing a display location of the map; a selection interface for selecting at least one of a time and date range of the route being displayed, and the like.

The present invention also includes apparatus and methods corresponding to the system embodiments described above.

An example embodiment of a method for time-based and geographic navigation of video content in accordance with the present invention comprises recording and encoding video content and associated metadata information for storage and transmission using a video capture and encoding module. The associated metadata information includes at least one of date and time information of the recording and geographic position information indicative of a recording location of the video capture and encoding module during the recording. The method further comprises communicating the recorded video content and the associated metadata information from the video capture and encoding module to a remote storage and web server device, and enabling, via a graphical user interface associated with the remote storage and web server device, display of an interactive map showing a route and current location of the video capture and encoding module. The method also comprises searching the recorded video content using at least one of the graphical user interface and the interactive map by the at least one of the date and time information and the geographic position information, and selecting recorded video content for one of streaming or downloading to a select location for display or storage.

The apparatus and methods of the present invention may also include various features of the system embodiments discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods, apparatus, and systems for time-based and geographic navigation of recorded or live video.

The methods, apparatus, and systems of the present invention enable operators at a remote location to search for video clips, or one or more live streaming clips on the recording device (which may be in a different location), based on either geographic location and date/time of the occurrence, including clips of live events being recorded in real time.

Figure 1:
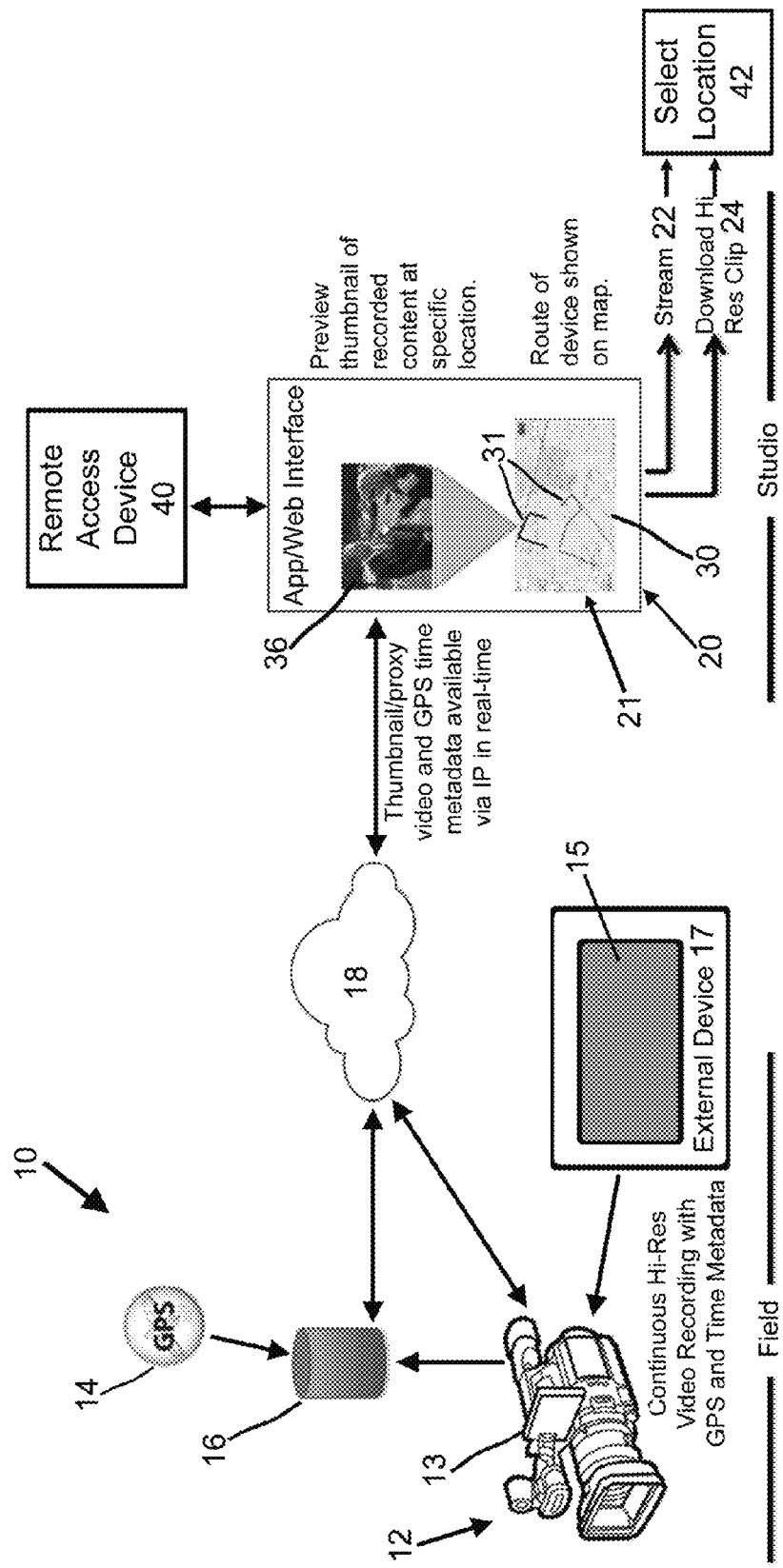
FIG. 1 shows an example embodiment of a system in accordance with the present invention.

An example embodiment of a system for time-based and geographic navigation of video content in accordance with the present invention is shown in FIG. 1. An Internet enabled video capture and encoding module 12 is provided for recording and encoding video content and associated metadata information for storage and transmission. The associated metadata information includes at least one of date and time information of the recording and geographic position information indicative of a recording location of the video capture and encoding module 12 during the recording. The system also comprises a remote storage and web server device 20 for receiving the recorded video content and the associated metadata information from the video capture and encoding module 12 via a network 18 (e.g., such as the Internet). The system further comprises a graphical user interface 21 associated with the remote storage and web server device 20. The graphical user interface 21 comprises an interactive map 30 showing a route 31 and a current location of the video capture and encoding module 12 and enables a search of the recorded video content by the at least one of the date and time information and the geographic position information. Selected recorded video content can be one of streamed 22 or downloaded 24 to a select location 42 for display or storage.

The video capture and encoding module 12 may contain the necessary processor, memory and other hardware to record and process the video content for transmission, and to connect to the network 18.

The network 18 may represent any type of network or combination of networks, such as the Internet, a satellite network, a cellular network, a WAN or a LAN, or any other type of over-the-air uplink system.

The system may also comprise a local storage module 16 associated with the video capture and encoding module 12 for locally storing the recorded video content and/or associated metadata information. The local storage module 16 may be integrated into the video capture and encoding module 12 (e.g., as integrated or removable memory) or separate therefrom but connected to the video capture and encoding module 12 via a wired or wireless connection. If the local storage module 16 is separate from the video capture and encoding module 12, the video capture and encoding module 12 may also comprise internal memory, as is well-known in the art. The local storage module 16 may store a high-resolution version of the video content and/or a low resolution version of the video content. A low-resolution version of the video content may be provided to the remote storage and web server device 20.

Alternatively, at least one of a high-resolution version or a low-resolution version of the video content may be provided (either directly from the video capture and encoding module 12 or via the local storage module 16) to the remote storage and web server device 20.

Upon selection of the recorded video content, a high-resolution version of the selected recorded video content is streamed 22 or downloaded 24 to the select location 42. The high-resolution version of the selected recorded video content may be streamed or downloaded from one of a local storage module 16 associated with the video capture and encoding module 12 or the remote storage and web server device 20. The selected recorded video content may also be streamed or downloaded directly from the video capture and encoding module 12 to the select location 42.

The select location 42 may comprise one of a video server, a client viewing device, a broadcast television channel, a streaming channel, a newsfeed, a website, a social media platform, a playout server, an archive server, a news automation system, a non-linear editing system, a content delivery network (CDN), an online video portal (OVP), and the like. The select location 42 may be entered via the graphical user interface 21.

The system may comprise multiple video capture and encoding modules 12. In such an example embodiment, a corresponding plurality of routes 31 and current locations for each of the plurality of the video capture and encoding modules 12 may be displayed on the interactive map 30.

Figure 2:
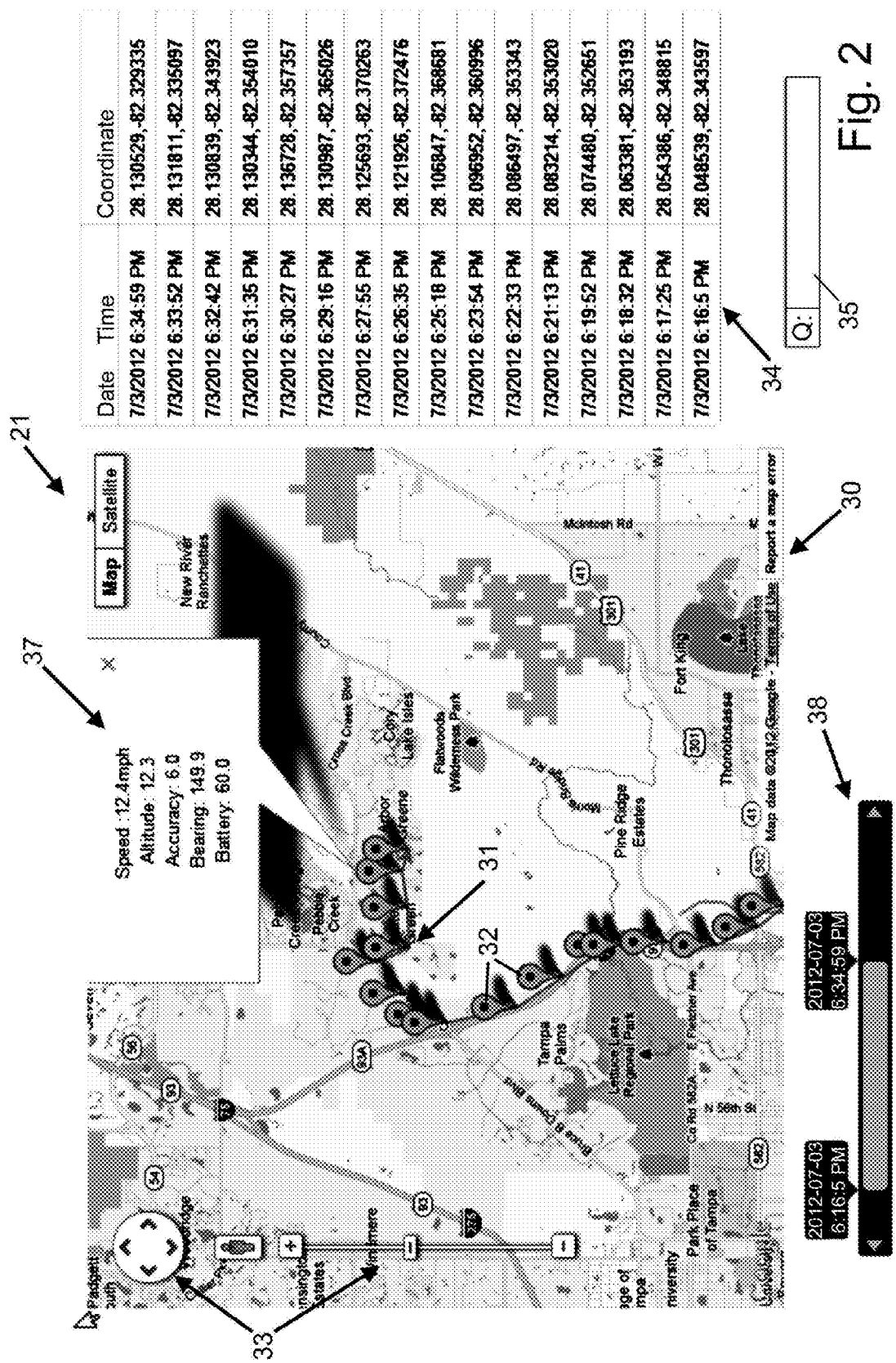
FIG. 2 shows an example embodiment of a graphical user interface in accordance with the present invention.

FIG. 2 shows an example embodiment of a graphical user interface 21 in accordance with the present invention. Two separate routes 31 are shown on the interactive map 30 of FIG. 1, while for clarity, only a single route 31 is shown on the interactive map 30 of FIG. 2. Multiple routes 31 for multiple video capture and encoding modules 12 may be shown. The number of routes 31 and/or the particular video capture and encoding modules 12 for which information is displayed on the map 30 may be configurable (e.g., if ten video capture and encoding modules 12 are active in the field, information for only three of those modules 12 which are close to a particular news event may be shown on the map 30).

As shown in FIG. 2, for each of the recording locations along the route 31, a waypoint indicator 32 may be displayed on the route 31 on the interactive map 30. Selecting one of the waypoint indicators 32 may enable viewing of one of a low-resolution photograph or a low resolution video clip 36 from the recorded content at the corresponding recording location.

The waypoint indicators 32 may comprise either a waypoint icon, a low-resolution photograph 36, or a low resolution video clip 36 from the recorded content at the corresponding recording location. FIG. 2 shows the use of a waypoint icon as a waypoint indicator 32 which, when selected (e.g., via a mouse click or mouse hover) gives various information 37 regarding the video capture and encoding module 12 which may be shown once the waypoint indicator 32 is selected, including but not limited to position, direction, altitude, speed and bearing information of the video capture and encoding module 12. Selection of a waypoint icon may also result in the display of a low resolution version of an image or video clip 36 from the recording location, as shown in FIG. 1. Alternatively, the image or video clip 36 can take the place of the waypoint icon as a waypoint indicator 32.

A number of the waypoint indicators 32 displayed along each route 31 may be configurable. For example, a number of waypoint indicators 32 shown along the route 31 may be configured by an amount of time or distance between each waypoint 32 (e.g., a waypoint every half mile or a waypoint every 5 minutes). In addition, a number of waypoint indicators 32 displayed along each route 31 may be automatically adjusted when zooming or expanding a map view of the map 30. For example, when expanding the map view, more of the route 31 and thus more waypoint indicators 32 along the route 31 may be shown automatically (e.g., while maintaining density and spacing of the waypoint indicators 32). Alternatively, when expanding the map view, the number of waypoint indicators 32 along a portion of the 31 route shown may be reduced or increased as desired. When zooming in to a particular portion of the map 30 or portion of a route 31, more waypoint indicators 32 may be shown.

The graphical user interface 21 may further comprise a table 34 showing date, time and GPS coordinates for each way point indicator 32. Selecting an entry from the table 34 may enable viewing of one of a low-resolution photograph or a low resolution video clip 36 (as shown in FIG. 1) from the recorded content at the corresponding recording location.

The system may further comprise a GPS module 14 associated with the video capture and encoding module 12 for providing the geographic position information. The GPS module 14 may be integrated into the video capture and encoding module 12 and/or the local storage module 16, or implemented separately therefrom. Depending on whether or not the local storage module 16 is integrated into the video capture/encoding module 12, the local storage module 16 and/or the video capture/encoding module 12 may be in communication with GPS 14.

The metadata information may further comprise at least one of camera location, length of video, video and audio format, timecode, size of video file, camera identification information, ownership and copyright information, and additional metadata information predefined or dynamically logged by a user, or any other type of identifying information. The additional metadata information may include at least one of assignment name, geographic location, camera man name, reporter name, camera crew name, assistant name, producer name, story title, subject matter reference, program name, user comments, and the like.

The metadata information is used by the remote storage and web server device 20 to enable the display of the map 30 and corresponding search features of the graphical user interface 21. The video content may be searchable by any of the metadata information or a combination of any of the metadata information. For example, searching via the metadata may be enabled via a search box 35 on the graphical user interface 21. Further, a user can also narrow the search by using additional metadata, such as camera crew name, story title, and the like.

The additional metadata information may be entered by the user via a keypad on the video capture and encoding module 12, via a touch screen keypad on a video screen 13 of the video capture and encoding module 12, or via an external device 17 in communication with the video capture and encoding module 12 (e.g., via a touch screen 15 or keypad on the external device 17). In addition, the additional metadata may also be entered via the graphical user interface 21 subsequent to recording of the video content.

The video capture and encoding module 12 may comprise one of a video camera, a camcorder, a television camera, a movie camera, a portable electronic device, a tablet computer, a smart phone, an IP or web camera, or the like.

A user may access the remote storage and web service device 20 directly or through a remote access device 40 for remotely accessing the remote storage and web server device 20 via the network 18. In such an example embodiment, the graphical user interface 21 may be displayed on the remote access device 40 and the remote access device may enable all the features of the remote storage and web server device discussed herein. The remote access device 40 may comprise one of a computer, a laptop computer, a portable electronic device, a tablet computer, a smart phone, or any other type of Internet enabled device.

The external storage device 16 may be integrated into the external device 17. In addition or alternatively, the external device 17 may include the same functionality as the remote access device 40. The external device 17 may be in wired or local wireless communication with the video capture and encoding module 12, or connected thereto via the network 18. The external device 17 may comprise one of a computer, a laptop computer, a portable electronic device, a tablet computer, a smart phone, or any other type of Internet enabled device.

The remote storage and web server device 20 may comprise one of a computer running a local software application or a cloud-based application, each of which provides a web interface.

The selected recorded video content may comprise one of a selected portion of the recorded content at high-resolution or low resolution, the entirety of the recorded content at high-resolution or low resolution, and a selected image or images from the recorded content at high-resolution or low-resolution.

The metadata may be one of: recorded and stored simultaneously with the recorded video content at the remote storage and web server device 20 in real-time or near real-time; or subsequently transferred with the recorded video content to the remote storage and web server device 20 from the local storage module 16 associated with the video capture and encoding module 12.

Alternatively, the metadata may be one of: recorded and stored without the recorded video content at the remote storage and web server device 20 in real-time or near real-time; or subsequently transferred to the remote storage and web server device 20 from the local storage module 16 associated with the video capture and encoding module 12 separately from the recorded video content.

The graphical user interface 21 allows an operator to search by geographic region (e.g., using the map and route tracking functions). The graphical user interface 21 may further comprise at least one of: a zoom feature for zooming in on the route or a portion of the route; an expand feature for expanding an area of the map; a location change feature for changing a display location of the map; a selection interface for selecting at least one of a time and date range of the route being displayed, and the like. Standard map navigation controls 33 for zoom, expand and location change may be used. The graphical user interface 21 also enables searching of the video content by date and time, by a range of dates and/or times (up to and including the current time/real-time searching), a timecode, and a current time, for example through the use of a slidable date/time interface 38.

In one example embodiment of the present invention, the video capture and encoding module 12, the GPS module 14, and the local storage module 16 may make up a subsystem 10. The remote storage and web service device 20 may receive and store the metadata information from one or multiple subsystems 10. Remote storage and web service device 20 may also store the associated video content from multiple subsystems 10. The graphical user interface 21 running on the remote storage and web service device 20 enables searching of the video content by at least date, time and/or location (based on the metadata information associated with the video content), and the ability to download and/or pass the video content or selected portions thereof (e.g., content stream 22 or high resolution video clip 24) on for further use or display.

Subsystem 10 may be located in the field (e.g., remote from a production facility). The remote storage and web service device 20 may be located at, for example, a production facility machine room. The remote access device 40 may be located at, for example, a news room. However, due to the potential portability of the subsystem 10, they can each be located at any location either remote from each other or in the same vicinity.

During use, the subsystem 10 records video content to the local storage module 16 (or internal memory of video capture/encoding module 12) and associated metadata, including but not limited to data from GPS 14. Part or all of the metadata is simultaneously recorded or transferred at a later stage onto the remote storage and web service 20 with or without the corresponding video content. The metadata is used by the remote storage and web service 20 to enable the display of the map 30 and corresponding search features. Once the desired content has been located based on geographic area, time, or other metadata, it is possible to either stream the content via IP from the field directly to a desired select location 42 (as shown at 22 in FIG. 1) or download the content (or a portion of it) in high resolution format (as shown at 24 in FIG. 1) at a select location 42.

It should now be appreciated that the present invention provides advantageous methods and apparatus for searching video content based on date, time, geographic location, or other metadata. The present invention advantageously enables video content recorded in a remote location to be accessed, searched, and reviewed by a user in another location just seconds after the content was recorded.

What is claimed is:

1. A system for time-based and geographic navigation of video content, comprising:
    a plurality of Internet enabled video capture and encoding modules, each of the video capture and encoding modules adapted for recording and encoding corresponding video content and associated metadata information for storage and transmission, the associated metadata information including at least one of date and time information of the recording and transmission, and geographic position information indicative of a recording location of the corresponding video capture and encoding module during the recording and transmission;
    a remote storage and web server device for receiving live or recorded video content and the associated metadata information from the video capture and encoding modules; and
    a graphical user interface associated with the remote storage and web server device comprising an interactive map showing a corresponding route and a current location for each of the video capture and encoding modules;
    wherein:
    the graphical user interface enables:
        a search and selection for display of the live video content based on the corresponding current locations; and
        a search and selection for display of the recorded video content by the at least one of the date and time information and the geographic position information;
    at least one of the corresponding route, the corresponding current location, and a corresponding time period of recording of each of the video capture and encoding modules is different; and
    the selected live or recorded video content is one of streamed or downloaded to a select location for at least one of display, storage, or further processing.

2. A system in accordance with claim 1, further comprising:
    a local storage module associated with each of the video capture and encoding modules for locally storing the live or recorded video content and associated metadata information.

3. A system in accordance with claim 2, wherein the local storage module is one of integrated into the video capture and encoding module or connected to the video capture and encoding module via a wired or wireless connection.

4. A system in accordance with claim 2, wherein the local storage module stores one of a high-resolution version of the video content or a low resolution version of the video content.

5. A system in accordance with claim 4, wherein the low-resolution version of the video content is provided to the remote storage and web server device.

6. A system in accordance with claim 1, wherein at least one of a high-resolution version or a low-resolution version of the video content is provided to the remote storage and web server device.

7. A system in accordance with claim 1, wherein, upon selection of the live or recorded video content, a high-resolution version of the selected live or recorded video content is streamed or downloaded to the select location.

8. A system in accordance with claim 7, wherein the high-resolution version of the selected live or recorded video content is streamed or downloaded from one of a local storage module associated with the corresponding video capture and encoding module or the remote storage and web server device.

9. A system in accordance with claim 1, wherein the select location comprises one of a video server, a client viewing device, a broadcast television channel, a streaming channel, a newsfeed, a website, a social media platform, a playout server, an archive server, a news automation system, a non-linear editing system, a content delivery network (CDN), and an online video portal (OVP).

10. A system in accordance with claim 1, wherein:
    for each of the recording locations along the corresponding routes, a waypoint indicator is displayed on the corresponding route on the interactive map.

11. A system in accordance with claim 10, wherein selecting one of the waypoint indicators enables viewing of one of a low-resolution photograph or a low resolution video clip from the live or recorded video content at the corresponding recording location.

12. A system in accordance with claim 10, wherein the waypoint indicators comprise one of a low-resolution photograph or a low resolution video clip from the live or recorded video content at the corresponding recording location.

13. A system in accordance with claim 10, wherein a number of waypoint indicators displayed along each route is configurable.

14. A system in accordance with claim 10, wherein a number of waypoint indicators displayed along each route is automatically adjusted when zooming or expanding a map view of the map.

15. A system in accordance with claim 10, wherein:
    the graphical user interface further comprises a table showing date, time and GPS coordinates for each waypoint; and
    selecting an entry from the table enables viewing of one of a low-resolution photograph or a low resolution video clip from the live or recorded video content at the corresponding recording location.

16. A system in accordance with claim 1, further comprising:
    a GPS module associated with each of the video capture and encoding modules for providing the geographic position information.

17. A system in accordance with claim 1, wherein:
    the metadata information further comprises at least one of camera location, length of video, video and audio format, timecode, size of video file, camera identification information, ownership and copyright information, and additional metadata information predefined or dynamically logged by a user;
    the additional metadata information includes at least one of assignment name, geographic location, camera man name, reporter name, camera crew name, assistant name, producer name, story title, subject matter reference, program name, and user comments;
    the video content is searchable by any of the metadata information or a combination of any of the metadata information.

18. A system in accordance with claim 17, wherein the video content is further searchable using at least one of a range of dates, a range of times, a timecode, and a current time.

19. A system in accordance with claim 1, wherein the interactive map displays current position, speed, and direction information of each of the video capture and encoding modules.

20. A system in accordance with claim 1, wherein each of the video capture and encoding modules comprises one of a video camera, a camcorder, a television camera, a movie camera, a portable electronic device, a tablet computer, a smart phone, and an IP or web camera.

21. A system in accordance with claim 1, further comprising:
a remote access device for remotely accessing the remote storage and web server device;
wherein:
the graphical user interface is displayed on the remote access device; and
the remote access device comprises one of a computer, a laptop computer, a portable electronic device, a tablet computer, and a smart phone.

22. A system in accordance with claim 1, wherein the remote storage and web server device comprises one of a computer running a local software application or a cloud-based application.

23. A system in accordance with claim 1, wherein the selected live or recorded video content comprises one of a selected portion of the live or recorded video content at high-resolution or low resolution, the entirety of the live or recorded video content at high-resolution or low resolution, and a selected image or images from the live or recorded video content at high-resolution or low-resolution.

24. A system in accordance with claim 1, the metadata is one of: recorded and stored simultaneously with the live or recorded video content at the remote storage and web server device in real-time or near real-time; or subsequently transferred with the live or recorded video content to the remote storage and web server device from local storage associated with the corresponding video capture and encoding module.

25. A system in accordance with claim 1, the metadata is one of: recorded and stored without the live or recorded video content at the remote storage and web server device in real-time or near real-time; or subsequently transferred to the remote storage and web server device from local storage associated with the corresponding video capture and encoding module separately from the live or recorded video content.

26. A system in accordance with claim 1, wherein the graphical user interface further comprises at least one of:
a zoom feature for zooming in on the corresponding route or a portion of the corresponding route;
an expand feature for expanding an area of the map;
a location change feature for changing a display location of the map;
a selection interface for selecting at least one of a time and date range of the corresponding route being displayed.

27. A method for time-based and geographic navigation of video content, comprising:
recording and encoding corresponding video content and associated metadata information for storage and transmission using a plurality of video capture and encoding modules, the associated metadata information including at least one of date and time information of the recording and transmission, and geographic position information indicative of a recording location of the corresponding video capture and encoding module during the recording and transmission;
communicating live or recorded video content and the associated metadata information from the video capture and encoding modules to a remote storage and web server device;
enabling, via a graphical user interface associated with the remote storage and web server device, display of an interactive map showing a corresponding route and current location for each of the video capture and encoding modules;
enabling, via the graphical user interface:
a search and selection for display of the live video content based on the corresponding current locations; and
a search and selection for display of the recorded video content by the at least one of the date and time information and the geographic position information; and
selecting the live or the recorded video content for one of streaming or downloading to a select location for at least one of display, storage, or further processing;
wherein at least one of the corresponding route, the corresponding current location, and a corresponding time period of recording of each of the video capture and encoding modules is different.

* * * * *